United States Patent
Burke et al.

(10) Patent No.: US 6,825,828 B2
(45) Date of Patent: Nov. 30, 2004

(54) BACKLIT LCD MONITOR

(75) Inventors: Thomas J. Burke, Ellington, CT (US); Gary Elco, Ellington, CT (US); Bryan Gudrian, South Windsor, CT (US)

(73) Assignee: General Digital Corporation, South Windsor, CT (US)

(*) Notice: Subject to any disclaimer, the term of this patent is extended or adjusted under 35 U.S.C. 154(b) by 139 days.

(21) Appl. No.: 10/080,983

(22) Filed: Feb. 21, 2002

(65) Prior Publication Data

US 2002/0167637 A1 Nov. 14, 2002

Related U.S. Application Data

(60) Provisional application No. 60/270,848, filed on Feb. 23, 2001.

(51) Int. Cl.[7] .................................................. G09G 3/36
(52) U.S. Cl. ...................................... 345/101; 345/102
(58) Field of Search .......................... 345/102, 87, 77, 345/589–605, 101

(56) References Cited

U.S. PATENT DOCUMENTS

| 5,844,540 A | 12/1998 | Terasaki ..................... 345/102 |
| 5,854,617 A | 12/1998 | Lee et al. ................... 345/102 |
| 6,188,378 B1 | 2/2001 | Yamamoto et al. ......... 345/101 |
| 6,255,784 B1 | 7/2001 | Weindorf ..................... 315/291 |

*Primary Examiner*—Dennis-Doon Chow
*Assistant Examiner*—Aaron S. Ward
(74) *Attorney, Agent, or Firm*—Cantor Colburn LLP

(57) ABSTRACT

An exemplary embodiment of the invention is a backlit liquid crystal display (LCD) monitor comprising a backlight assembly, a cooling assembly, a rear cover assembly and a controller. The controller monitors temperature and controls cooling accordingly. The controller also monitors bulb luminance and adjusts bulb current accordingly. Faults are monitored and logged so that predictive repair before failure analysis may be performed.

13 Claims, 16 Drawing Sheets

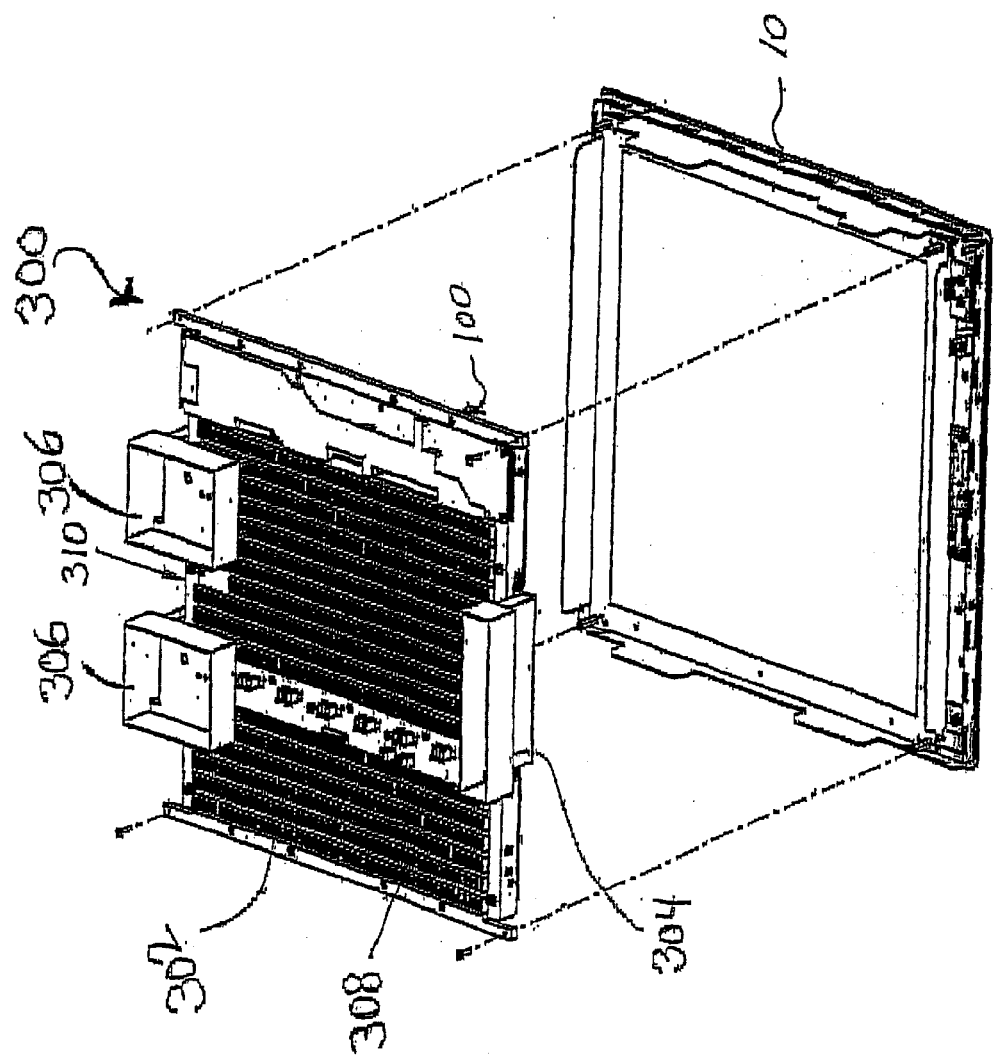

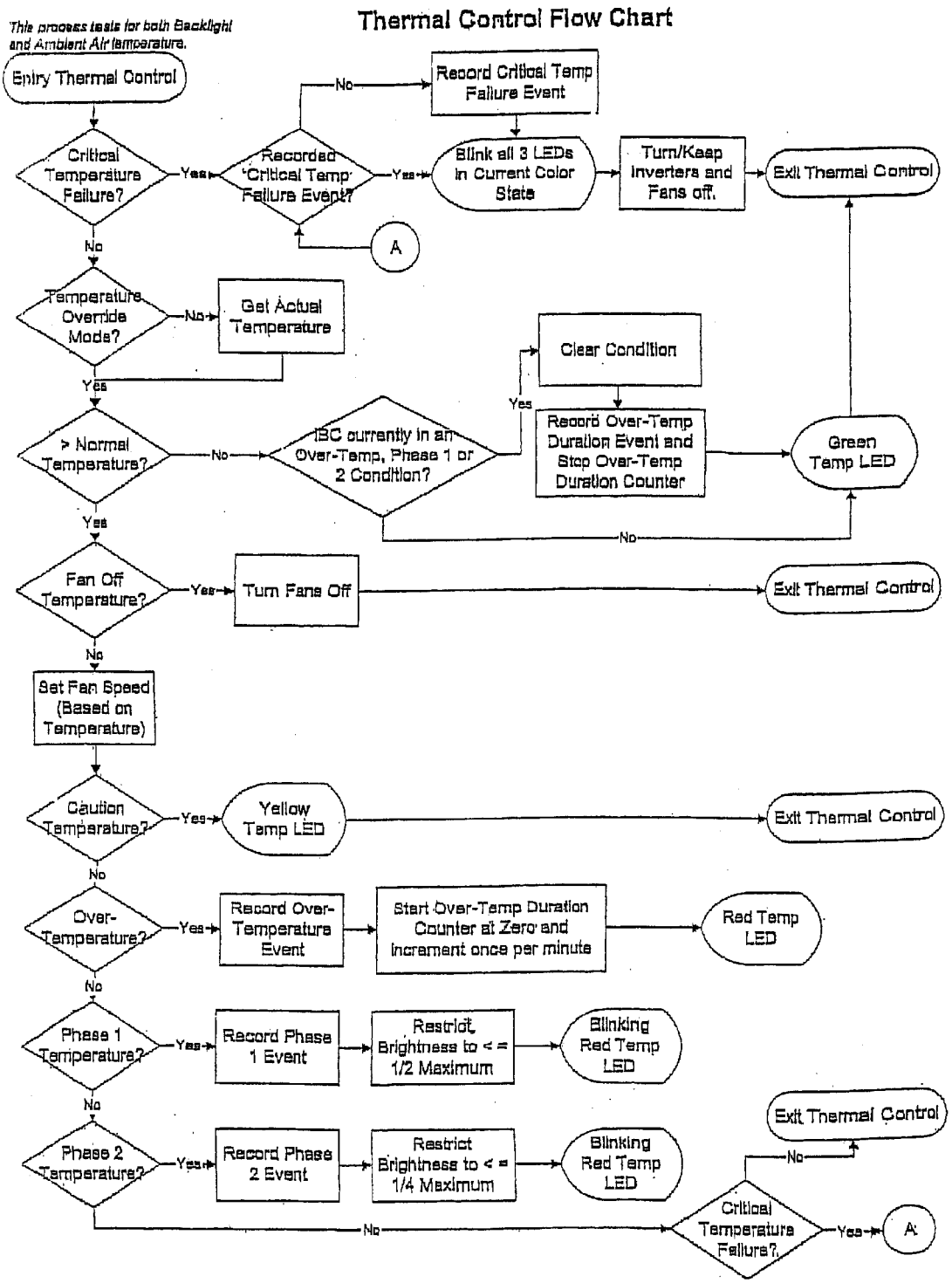

US 6,825,828 B2

BACKLIT LCD MONITOR

CROSS-REFERENCE TO RELATED APPLICATIONS

This application claims the benefit of U.S. provisional patent application Ser. No. 60/270,848, filed Feb. 23, 2001, the entire contents of which are incorporated herein by reference.

BACKGROUND OF THE INVENTION

The invention relates to backlit liquid crystal display (LCD) monitors. Backlit LCD monitors are often used in applications where ambient conditions such as sunlight can negatively affect the ability to view the display. Such applications include air traffic control displays viewed by air traffic controllers sitting at computer screens located in an airport control tower. Backlit LCD monitors are also useful in maritime applications (barges, aircraft carriers and tugs), making it possible to execute and interpret output from shipboard instrumentation such as navigation, targeting, IFF and weapons control from a monitor mounted on the vessel, even if the monitor is subject to extreme lighting conditions such as bright sunlight or total darkness. Further applications can include automatic teller machines (ATMs), kiosks and any other applications where the ability to view the computer screen could be adversely affected by ambient conditions. Backlit LCD monitors can provide increased brightness in order to compensate for adverse conditions such as bright sunlight and total darkness and high glare.

SUMMARY OF THE INVENTION

An exemplary embodiment of the invention is a backlit liquid crystal display (LCD) monitor comprising a backlight assembly, a cooling assembly, a rear cover assembly and a controller. The backlight assembly has opposing top and bottom surfaces and the bottom surface includes a plurality of fluorescent bulbs with parallel bulb axes and two or more inverters to drive the bulbs. The cooling assembly has opposing top and bottom surfaces and the top surface of the cooling assembly is mounted on the bottom surface of the backlight assembly to form a closed air space around the bulbs. The cooling assembly includes: a light sensor on the top surface of the cooling assembly and the light sensor has an axis that is perpendicular to the bulb axes of the fluorescent bulbs, a temperature sensor, a heat sink on the bottom surface of the cooling assembly, and an air inlet and an air outlet in fluid communication with the closed air space and positioned for causing air to flow across the bulbs. The rear cover assembly is placed over the bottom surface of the cooling assembly and includes: an exhaust fan in fluid communication with the air outlet, a cover inlet in fluid communication with the air inlet, a filter placed over the cover inlet and a fan positioned to draw air towards the heat sink. The controller is electrically connected to the sensor, inverters and fans.

Another embodiment of the invention is a method of controlling a backlit liquid crystal display monitor. The method comprises receiving target data including target heat sink temperature, target backlight chamber temperature and target bulb luminance. The method also comprises receiving actual data including actual heat sink temperature, actual backlight chamber temperature, actual bulb luminance, heat sink fan status and current, exhaust fan status and current, and inverter status and current. The method further comprises adjusting the monitor settings in response to the target data and the actual data. The adjusting includes setting input current to the inverter, setting the heat sink fan speed, and setting the exhaust fan speed. The method further comprises sending a notification in response to the target data, the actual data and said adjusting.

The above described and other features are exemplified by the following figures and detailed description.

BRIEF DESCRIPTION OF THE DRAWINGS

Referring now to the figures, which are exemplary embodiments, and wherein the like elements are numbered alike:

FIG. 3 is an exploded, perspective view of the cooling assembly and LCD screen;

FIG. 7G is a flowchart of an exemplary thermal control process;

DETAILED DESCRIPTION OF THE INVENTION

Figure 1:
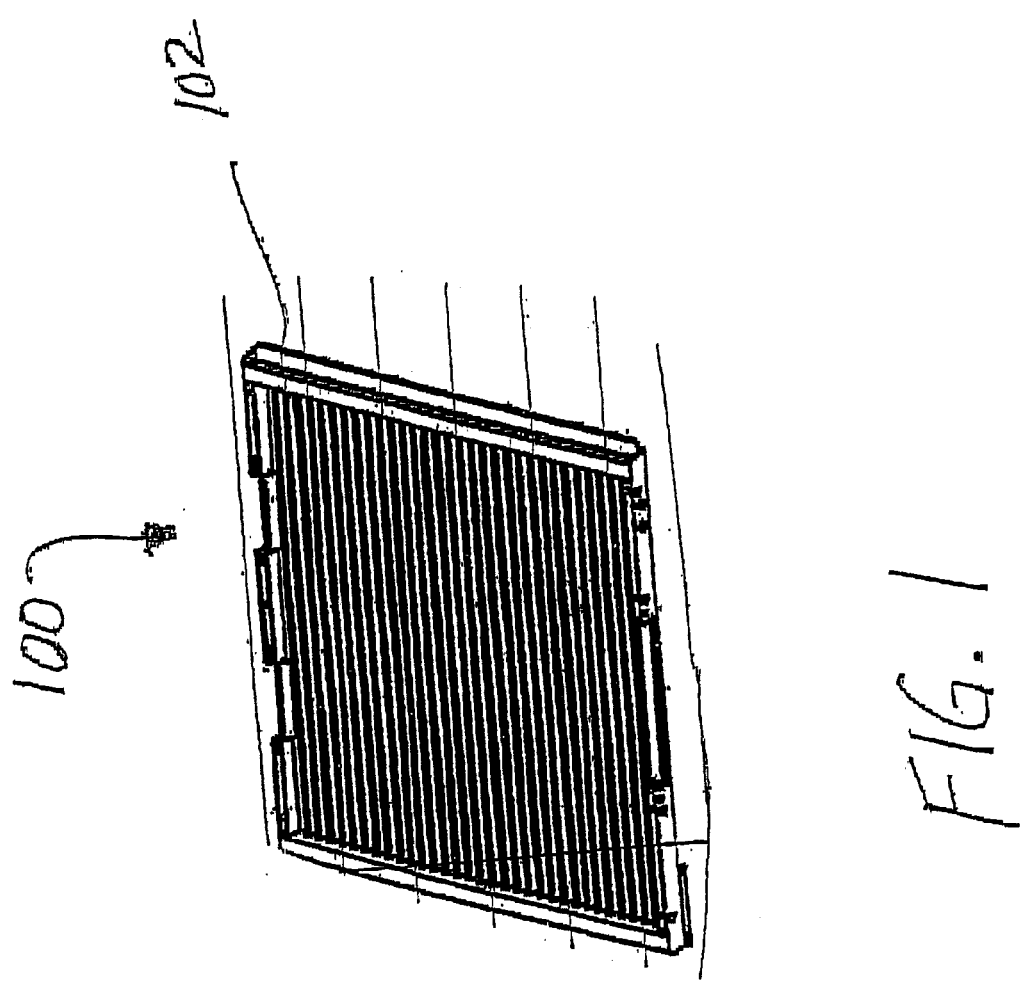
FIG. 1 is a perspective view of the backlight assembly portion of a backlit LCD monitor.

An exemplary embodiment of the invention is a backlit liquid crystal display (LCD) monitor having an enhanced cooling system that can allow the monitor to operate at higher ambient temperatures and can promote bulb life. Another embodiment of the invention includes a backlight controller that controls operation of the backlit LCD monitor, monitors faults and performs replace before fail analysis. FIG. 1 is a perspective view of an exemplary embodiment of the backlight assembly 100 of a backlit LCD monitor. Shown in FIG. 1 is a backlight assembly 100 that includes a series of fluorescent bulbs 102 having parallel longitudinal axes. The bulbs 102 provide the backlight source used in the backlit LCD monitor. In as exemplary embodiment of the present invention, the bulbs 102 are driven by two inverters to generate a backlight luminance of 1000 nits and the backlights have a maximum capability of providing over 1400 nits of luminance. In an exemplary embodiment, 31 cold cathode flourescent tubes (CCFT) are aligned horizontally in parallel, running from the left to the right of the LCD. The CCFTs are housed in a rugged aluminum enclosure that is lined with a highly reflective, flame retardant material that is designed to harness all of the light that is generated by the CCFTs and focus it towards the LCD.

Figure 2:
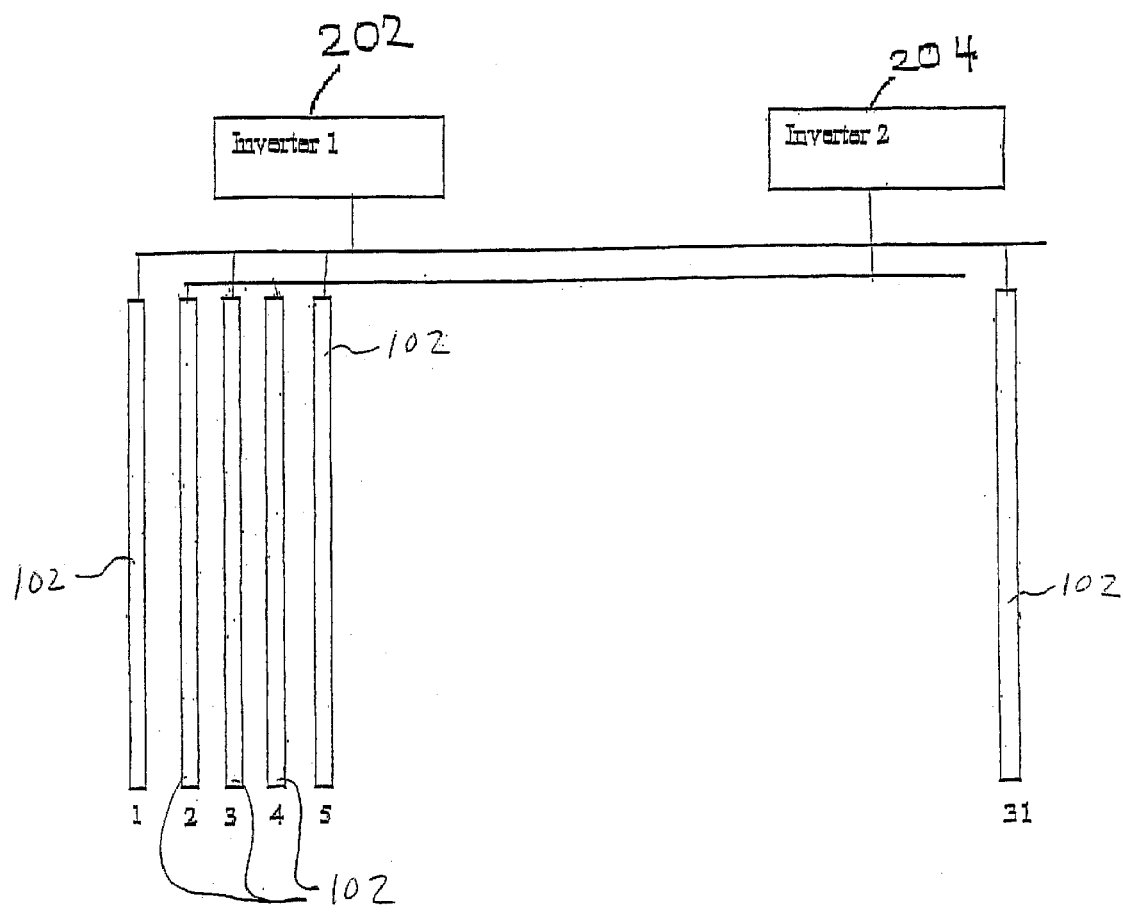
FIG. 2 depicts interlaced bulbs and inverters in an embodiment of the invention.

FIG. 2 illustrates an exemplary embodiment of how the bulbs 102 are driven electrically. The backlit LCD monitor includes two inverters 202/204 for driving the bulbs 102. In a preferred embodiment, thirty-one bulbs 102 are used and the bulbs are interlaced between the two inverters 202/204. Every other bulb 102 is connected to the same inverter 202/204 so that, in the example shown in FIG. 2, odd numbered bulbs 102 are coupled to inverter 202 and even numbered bulbs 102 are coupled to inverter 204. If one inverter 202/204 fails, sufficient backlight is generated across the entire display area by the bulbs 102 coupled to the working inverter 202/204.

FIG. 3 is an exploded, perspective view of the cooling assembly 300 coupled to the backlight assembly 100 and an LCD screen 10. Shown in FIG. 3 is a cooling assembly 300 which is mounted on the backside of the backlight assembly 100 and comprises a combination of passive and active cooling techniques. Light from the backlight assembly 100 is emitted to an LCD screen 10 opposite the cooling assembly 300. The cooling assembly 300 includes a heat sink 302, which in an exemplary embodiment comprises a finned aluminum plate, for conducting heat away from bulbs 102. The heat sink 302 lies on the side of the cooling assembly 300 that faces away from the backlight assembly 100. In an exemplary embodiment, the heat sink is constructed from a milled block of aluminum or aluminum extrusion to optimize the thermal coefficient. Heat that is generated by the backlights is dissipated through the heat sink fins that provide optimized surface area.

In an exemplary embodiment, the cooling assembly 300 also includes an air inlet 304 and two air outlets 306. Bulbs 102 are positioned in a closed air space, also referred to as the backlight chamber, provided between backlight assembly 100 and cooling assembly 300. A gasket could be used to connect the backlight assembly 100 and the cooling assembly 300 in order to create the closed air space. The air inlet 304 and air outlets 306 are in fluid communication with this internal closed air space. Also shown in FIG. 3 is a light/temperature sensor assembly 308 which includes a number of light sensors to monitor the light output across bulbs 102 and a temperature sensor to measure the temperature of the backlight chamber. The light sensor axes are positioned perpendicular to the axes of the bulbs 102. Signals from the light sensors are provided to a controller for monitoring as described in further detail herein. Also shown in FIG. 3 is a temperature sensor 310 on the back of the cooling assembly 300 that faces away from the backlight assembly 100. This temperature sensor measures the temperature of the air near the heat sink 302 in the electronics chamber.

Figure 4A:
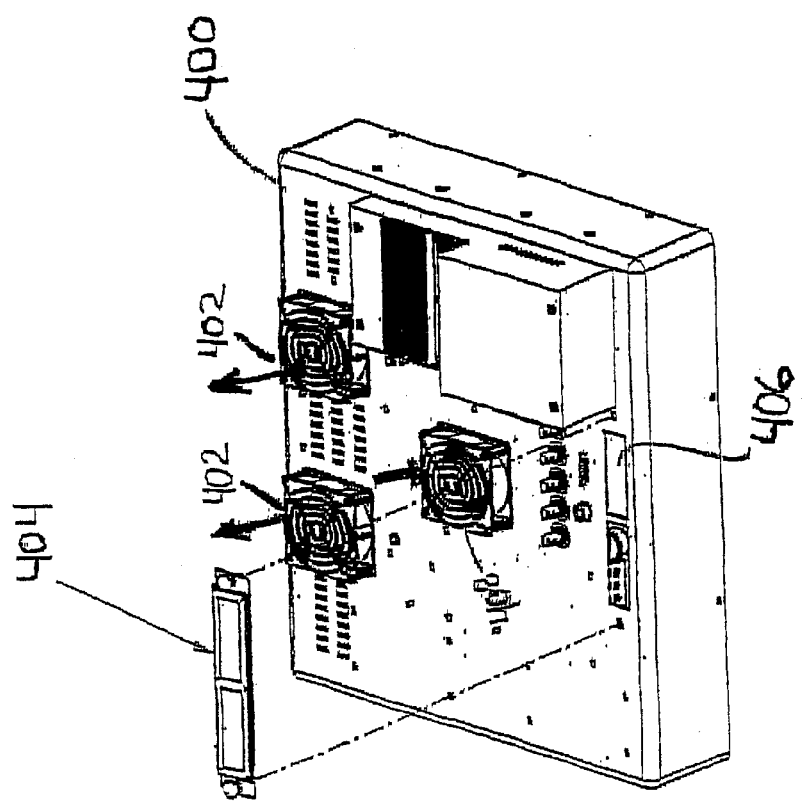
FIG. 4A is an exploded, perspective view of the rear cover assembly of the backlit LCD monitor.

FIG. 4A is an exploded, perspective view of an exemplary embodiment of the rear cover portion of the backlit LCD monitor. Shown in FIG. 4A is a rear cover assembly 400 which is placed over the cooling assembly 300. The rear cover assembly 400 includes exhaust fans 402 in fluid communication with the air outlets 306. Exhaust fans 402 direct air away from the rear cover assembly 400 as indicated by the arrows in FIG. 4A. A filter (e.g. a HEPA filter) 404 is placed over a cover inlet 406. In another embodiment, some other dust reducing device such as a gas purging system or another form of dust free air supply may be used in place of the filter. The cover inlet 406 is in fluid communication with the air inlet 304 on the cooling assembly 300. During operation, the exhaust fans 402 draw air through the filter 404, through the air inlet 304, over the bulbs 102 and out through the air outlets 306. This reduces the interior temperature of the backlit LCD monitor and allows the bulbs 102 to operate at a higher current and/or in higher ambient temperature conditions. Another fan 408 in the rear cover assembly 400 directs air into the space between the rear cover assembly 400 and the cooling assembly 300, hereafter referred to as the "electronics chamber", as indicated by the arrow in FIG. 4A. This air is directed through an opening in the rear cover assembly 400 and onto the heat sink 302. This further reduces the interior temperature of the electronics chamber of the backlit LCD monitor.

Figure 4B:
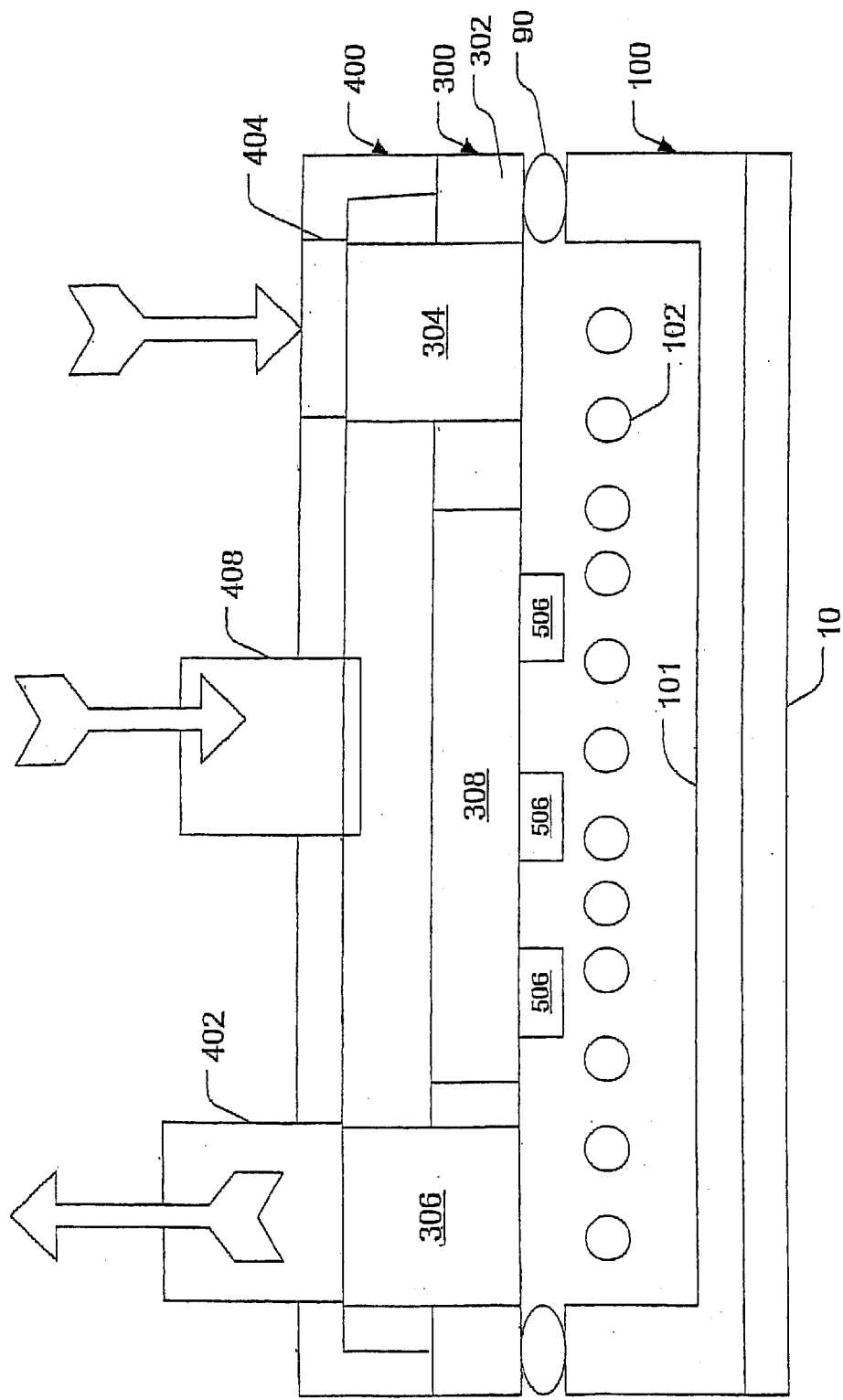
FIG. 4B is cross-sectional view of backlight assembly, cooling assembly and rear cover assembly.

FIG. 4B is a cross-sectional view depicting the backlight assembly 100, the cooling assembly 300 and the rear cover assembly 400. The front of the backlight assembly 100 may include a diffuser 101 so that light emitted to the LCD screen 10 is uniform. As noted above, a gasket 90 may be used to form an airtight chamber encompassing bulbs 102 between the backlight assembly 100 and the cooling assembly 300. Fan 402 draws air over bulbs 102 through filter 404. In addition, fan 408 directs air at the heat sink 302. As described in further detail herein, the fans are controlled by a controller in response to sensed temperature.

Figure 5:
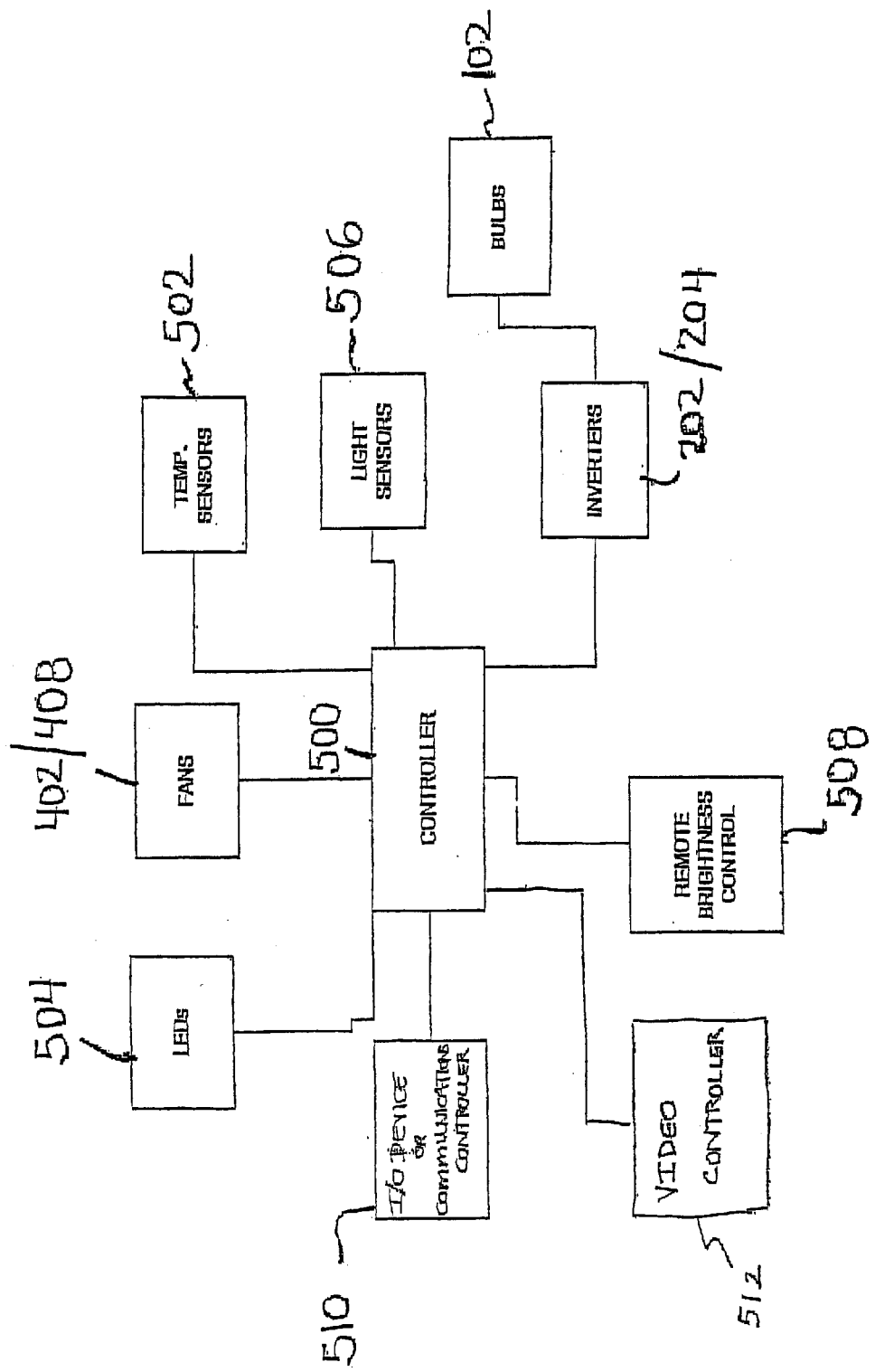
FIG. 5 is a block diagram of an exemplary backlit LCD monitor control system.

FIG. 5 is a high level block diagram of an exemplary backlit LCD monitor control system. In an exemplary embodiment, the system includes a microprocessor based controller 500 or application specific integrated circuit (ASIC) that is designed to optimize the performance of an LCD monitor by monitoring, controlling and recording the performance of each of the monitor subsystems. One function of the controller 500 is to control the brightness of the bulbs 102 through the inverters 202/204. Light sensors 506, part of the sensor assembly 308 mounted on the side of the cooling assembly 300 facing the backlight assembly 100, monitor the brightness of the bulbs 102 and provide brightness signals to the controller 500. Multiple light sensors 506 may be used, and the signals may be averaged to provide an average brightness. Based on the sensed brightness, the controller 500 can increase or decrease the current to the inverters 202/204 in order to increase or decrease the output of the bulbs 102.

In an exemplary embodiment, the bulbs 102 are driven to produce 1000 nits of luminance but have a capability of generating 1400 nits of luminance. As the bulbs 102 age, it takes more current to generate the 1000 nits of luminance. Once the maximum current is applied to the bulbs 102 and the luminance drops below some threshold (e.g., 950 nits), warnings to the user may be generated through the light emitting diode (LED) 504. Such warnings may be repeated at regular intervals (e.g., a warning at every 50 nits decrease). Fault data associated with the drop in luminance may be stored in memory associated with the controller (e.g., RAM, NVRAM). In addition, fault data may be communicated to a local or remote operator by sending data through a network or other data communications connection that can be provided by the I/O device 510. Event data, fault data and alert messages may be sent and instructions may be received by the controller 500 through the I/O device 510.

In a preferred embodiment, operators are permitted to vary the brightness of the LCD monitor via a locally mounted potentiometer or though an external remote brightness control box 508 and/or via I/O device 510 as depicted in FIG. 5. The brightness control device may in communication with the controller in an electrical fashion and it may in communication via a wireless connection such as infrared. The controller 500 monitors a remote brightness control interface to determine if a remote brightness control box 508 is present. If the remote brightness control box 508 is detected, dimming control (priority) is passed to the remote brightness control box 508 thereby disabling the local potentiometer controls. The local potentiometer is the system's default dimming control. In an exemplary embodiment, the remote brightness control box 508 comprises a multi-position switch and a potentiometer. The switch allows the selection of a series of pre-defined brightness ranges as well as manual override. Examples of some ranges, where the nits are measured at the surface of the LCD, include: nighttime mode (e.g. 0.5 to 200 nits); normal mode (e.g. 201 to 700 nits); sunlight mode (e.g. 701 to 1000 nits); and manual mode (e.g. full dimming control). The potentiometer in the remote brightness control box 508 varies brightness within the selected range.

The remote brightness control box 508 is used as part of a closed loop control method including the brightness sensors 506, the controller 500 and the remote brightness control box 508. The remote brightness control box 508 provides a signal (e.g., voltage) to the controller 500. The controller then converts this signal to a brightness level using known techniques (e.g., mathematical equation, look-up table, etc.). The controller 500 then monitors the bulb brightness through brightness sensors 506 and adjusts bulb current to maintain the brightness at the user-defined level.

By using a look-up table to define brightness settings, the controller 500 can be updated to accommodate age of the display or application of the display. For example, if the display is moved from bridge of ship to the engine room, the tables defining brightness levels in controller 500 may be updated (e.g., through I/O device 510) to set new brightness levels for this environment.

The controller 500 continuously monitors the inverters 202/204 for over-current, under-current and open circuit conditions. As described above, in reference to FIG. 2, an exemplary embodiment includes two inverters 202/204 and each inverter 202/204 drives one half of the backlight bulbs 102, in an interleaved or alternating pattern. In the event that a single inverter 202/204 experiences a critical failure, only that portion of the bulbs 102 will be disabled, rendering the display at partial brightness, but completely operational. This is regarded as a soft failure. Since the remaining bulbs 102 will remain unaffected by a singular failure, the LCD display will maintain a uniform brightness across its entire surface. If an over-current, undercurrent or open circuit condition is detected, the controller 500 records these faults into non-volatile memory and visually alerts operators via the status LED 504. In the event of an over-current or under-current condition, the controller 500 will automatically shut down the affected inverter 202/204. In an exemplary embodiment with two inverters 202/204, the target brightness is cut in half if an inverter 202/204 is shut down. The controller 500 can also send an alert message to a remote or local operator using a network connection provided by the I/O device 510. In addition, the controller 500 can receive instructions from an operator through the I/O device 510.

The output (or brightness) of the bulbs 102 can be affected by temperature and bulb decay. In an exemplary embodiment, the controller 500 can limit the maximum operator-controlled brightness to a programmed value well below the maximum bulb brightness. This can aid in extending the life of the bulbs 102 and can allow the controller 500 to maintain the programmed maximum brightness for extended periods of time. The light sensors 506 are continuously monitored for proper function, and in the event of a single or multi-modal failure(s), the failure is recorded to non-volatile memory and future readings from the failed sensor 506 are disregarded until the sensor 506 is repaired. Bulb condition may be determined based on present bulb current and/or present bulb temperature. Also, cumulative bulb current may be monitored to determine bulb condition and whether a failure is imminent. For example, if the cumulative bulb current for a bulb has exceeded a threshold, this indicates that a bulb failure is imminent.

Failure data and operator alerts can be sent to a remote or local operator through a network connection provided by the I/O device 510. When the bulbs 102 are no longer able to sustain the maximum brightness established by the controller 500, the controller 500 records the maximum brightness into non-volatile memory. This maximum brightness data recorded can be recorded at programmable intervals. This information can assist in determining the need to replace the backlight bulbs 102 before a critical failure has been experienced.

As shown in the exemplary embodiment depicted in FIG. 5, the controller 500 also monitors the temperature in the backlit LCD monitor through temperature sensors 502. Multiple temperature sensors 502 may be used in the backlit LCD monitor. For example, one temperature sensor 502 may monitor the temperature in the electronics chamber and another temperature sensor 502 may monitor ambient temperature in the closed air space, or backlight chamber, between the backlight assembly 100 and the cooling assembly 300. Exceeded temperature limits can be detected and warnings issued to the user through the LED 504. A fault may be stored in memory associated with the controller (e.g., RAM, NVRAM) or may be connected to a real-time monitoring or data gathering system or computer.

The controller 500 activates the fans 402/408 when the reported temperature from the temperature sensors 502 exceeds a minimum temperature (e.g., 20° C.) programmed into the controller 500. This allows the bulbs to attain optimum minimum bulb wall temperature (MBWT). Once activated by the controller 500, the fan speed is determined by the internal temperature sensed by the temperature sensors 502. A programmable maximum operating temperature can be set in the controller 500. In an exemplary embodiment, if either of the temperature readings is within five degrees of the maximum operating temperature, the event is recorded and date/time stamped into non-volatile memory and a visual indicator is provided on the LED 504. If the temperature achieves, or exceeds, the maximum recommended operating temperature, an event is recorded and date/time stamped, and a different visual indicator is provided on the LED 504. The duration of the over-temperature condition can be recorded for warranty and troubleshooting purposes. An identical process can be performed for an under-temperature condition where the minimum operating temperature is programmable and can be set by an operator. This allows the bulb temperature to remain in a preferred temperature range often referred to as a "sweet spot." It is known that certain bulbs operate more efficiently at an optimum MBWT. The control techniques used in the invention allow the bulb temperature to remain in this range.

If the over-temperature condition persists, the controller 500 executes a soft failure that begins by reducing the inverter output in steps (e.g. by 50%, then by another 50%) and it may result in one of the inverters 202/204 being shut off completely if reducing inverter output does not cure the over-temperature condition. When the temperature returns to a safe operating range, the controller 500 will return the inverters 202/204 to normal operation. If the temperature does not return to a safe operating range then the monitor will be shut-down completely while still allowing log data to be downloaded through the I/O device 510. In addition, the controller 500 records the maximum and minimum temperature extremes, experienced while under power on the non-volatile memory or monitoring computer. Alert messages can be sent from the controller 500 and instructions can be received by the controller 500 through a network connection implemented by the I/O device 510.

As depicted in FIG. 5, the fans 402/408 are monitored by the controller 500. Fan failure can be detected by the controller 500 and a warning issued to the user through the LED 504. An anomaly in the current waveform of a fan 402/408 may indicate a fan failure or fault and the fault may be stored in the memory associated with the controller.

In an exemplary embodiment, a personal computer is used to execute software that predicts failures and determines the need for preventive maintenance using fault and event data that has been logged in the memory associated with the controller 500. In addition, a personal computer can be used to control the backlit LCD monitor through a diagnostic mode in which backlit LCD monitor parameters (e.g., bulb brightness, temperature) can be monitored and controlled from a personal computer.

The I/O device 510 allows the controller 500 to send data to an external device, such as a personal computer, for analysis and to receive commands from the external device. In addition to receiving commands from an external device, software upgrades to the controller can also be received from an external device. An embodiment of the present invention provides a secure, password protected method of performing software upgrades. In an exemplary embodiment, the external device is a personal computer that can use the I/O device or communication controller 510 to access fault and event data in the log stored in the memory associated with the controller 500. A video controller 512 is also connected to the controller 500. In addition to a personal computer, any external device known in the art that can execute computer software can be used with the present invention. The personal computer can execute software to perform predictive fault analysis using the log data and historical statistical data to determine if failure of the backlit LCD monitor is imminent and recommend appropriate service. For example, bulb current and brightness can be recorded at pre-selected intervals. This data, or an aggregate of this data for several monitors, can be used to predict failures and replacement timeframes. Also, the personal computer can issue commands to the controller 500 through I/O device 510 to perform a variety of actions such as a command to modify brightness. The I/O device 510 may be a serial port (e.g., RS232 port), an infrared data association (IrDA) port, a communications controller or any other communications interface known in the art. In an exemplary embodiment, the I/O device 510 allows the controller to send and receive data over a communications network.

In an exemplary embodiment, the controller 500 date/time stamps and records all of the failures and events in non-volatile memory. The log data stored in non-volatile memory can include: the conditions at failure (e.g., temperatures, fan speeds, brightness), the duration of the failure and the action taken in response to the failure. In addition to fault and event data, the controller 500 can maintain data that includes: date of manufacture of the monitor, serial number of the monitor, component serial numbers, installation dates, hours in use, and warranty expiration dates, system alias, and non-volatile memory available. In an exemplary embodiment, the components include: AC power supply, LCD video controller, brightness sensor array module, three cooling fans, inverter module, DC/DC power supply, backlight assembly, controller 500, and LCD display. The recorded data in the controller can be retrieved for viewing and additional analysis through the I/O device 510.

In an exemplary embodiment, an operator can request, through the I/O device 510, a snapshot of the current conditions in the monitor. The data sent to the operator can include: failure data, current temperatures, current fan speeds, current brightness, run time for the monitor and for each component, current status of each component, the minimum and maximum temperatures, the amount of controller memory currently in use and the software version being executed by the controller.

In an exemplary embodiment, the LED 504 depicts the status of the fans 402/408, the temperature, the power and the inverters 202/204. The fan status LED can be set to "green" to indicate that the fan status is "good" and set to "red" if a fan failure has occurred. The temperature status LED can be set to "green" if the temperature is a "safe temperature", set to "yellow" if the temperature is a "caution temperature", and set to "red" if the temperature is an "over temperature." Similarly, the power status LED can be set to "off" to indicate "no power", "green" to indicate "power good", "yellow" to indicate "video standby", and "red" to indicate "no video controller power." All of the LEDs can be programmed to blink or flash when an inverter failure is detected or an inverter 202/204 is shut off by the controller 500 due to an over-temperature condition. The LEDs indicate an overall status and more detailed data can be recorded in log contained in the memory associated with the controller 500.

Figure 6:
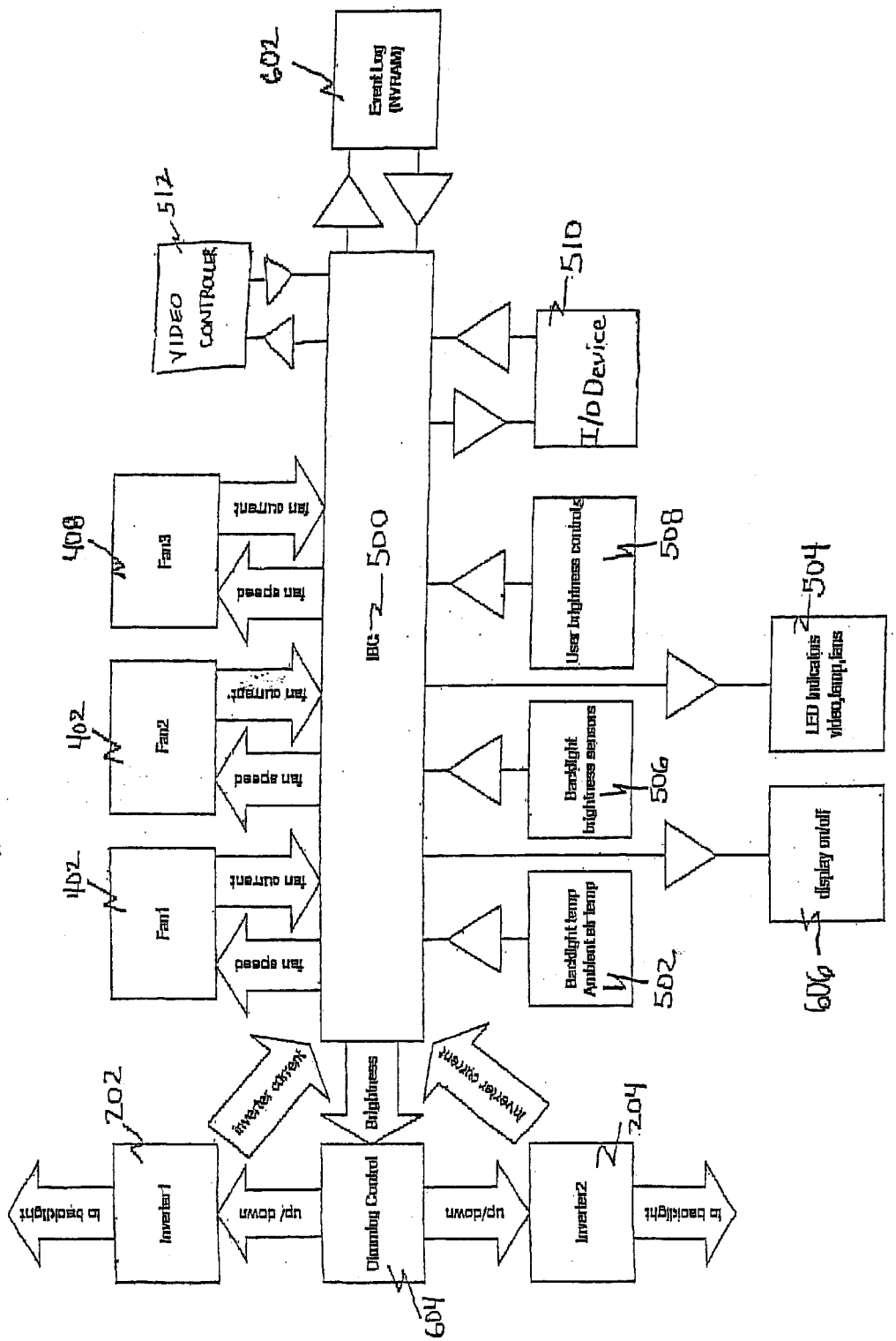
FIG. 6 is a block diagram of the data flow in an exemplary backlit LCD monitor control system.

FIG. 6 is a block diagram of the data flow in an exemplary backlit LCD monitor control system. The controller 500 receives data that could include fan current data from the fans 402/408, log data from the memory 602 associated with the controller 500, data from the I/O device 510, data from the video controller 512, user input brightness control 508 data, brightness data from the brightness sensors 506, temperature data from the temperature sensors 502, and inverter current data from the inverters 202. The controller 500 can use this data to send instructions to the fans 402 to specify and set the speeds of the fans. The controller 500 can also use the data it receives to set the brightness of the bulbs 102 by setting the dimming control 604 which in response will turn the inverter 202/204 current up or down. The controller 500 can also use the data it receives to determine when and what to write to the log 602, to determine data to send to the I/O device 510, to determine how the lights on the LED indicators 504 should be set, and to turn the display on or off 606.

Figure 7A:
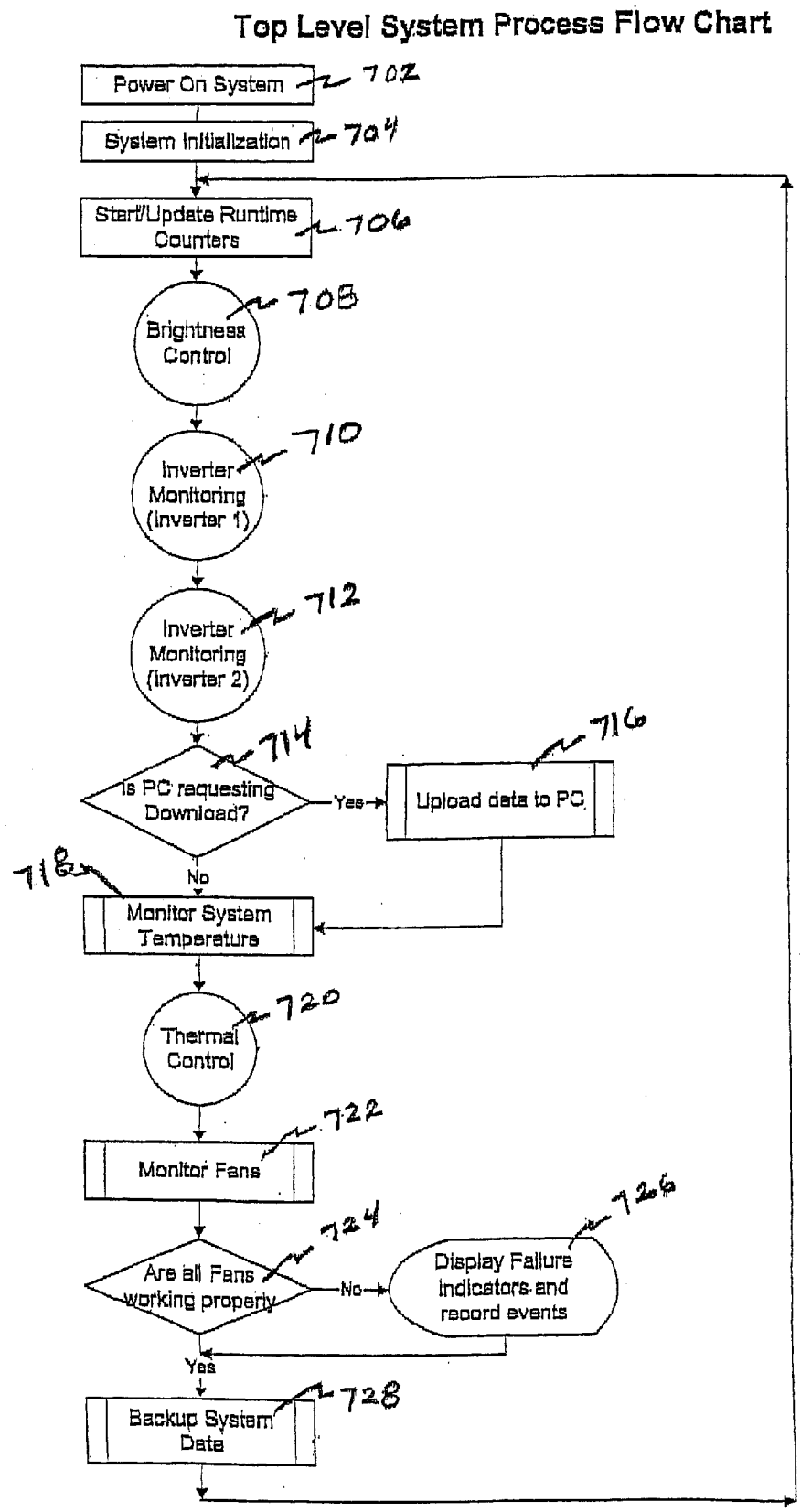
FIG. 7A is a flowchart of a process performed by an exemplary backlit LCD monitor control system.

FIG. 7A is a flowchart of an exemplary control process that can be executed by the controller 500. The flowchart illustrates that the controller 500 monitors the status of several elements (e.g., bulbs, inverters) and stores a record of the status and of any failures on the log. The log records can then be downloaded to a personal computer, or other external device or communicated, real-time, to a monitoring computer for predictive fault analysis. Operators can also be alerted to faults through the LEDs 604 on the backlit LCD monitor. The process begins at step 702 when the power to the monitor is turned on. Next, at step 704 system initialization occurs which can include steps such as setting the inverters 202/204 and displaying an initial screen. Next, a loop is started at step 706 that goes through step 728 and is repeated until the monitor is powered off. At step 706, the runtime counters are updated. The first time the loop is executed the runtime counters are started and with each subsequent execution of the loop the runtime counters are updated.

Figure 7B:
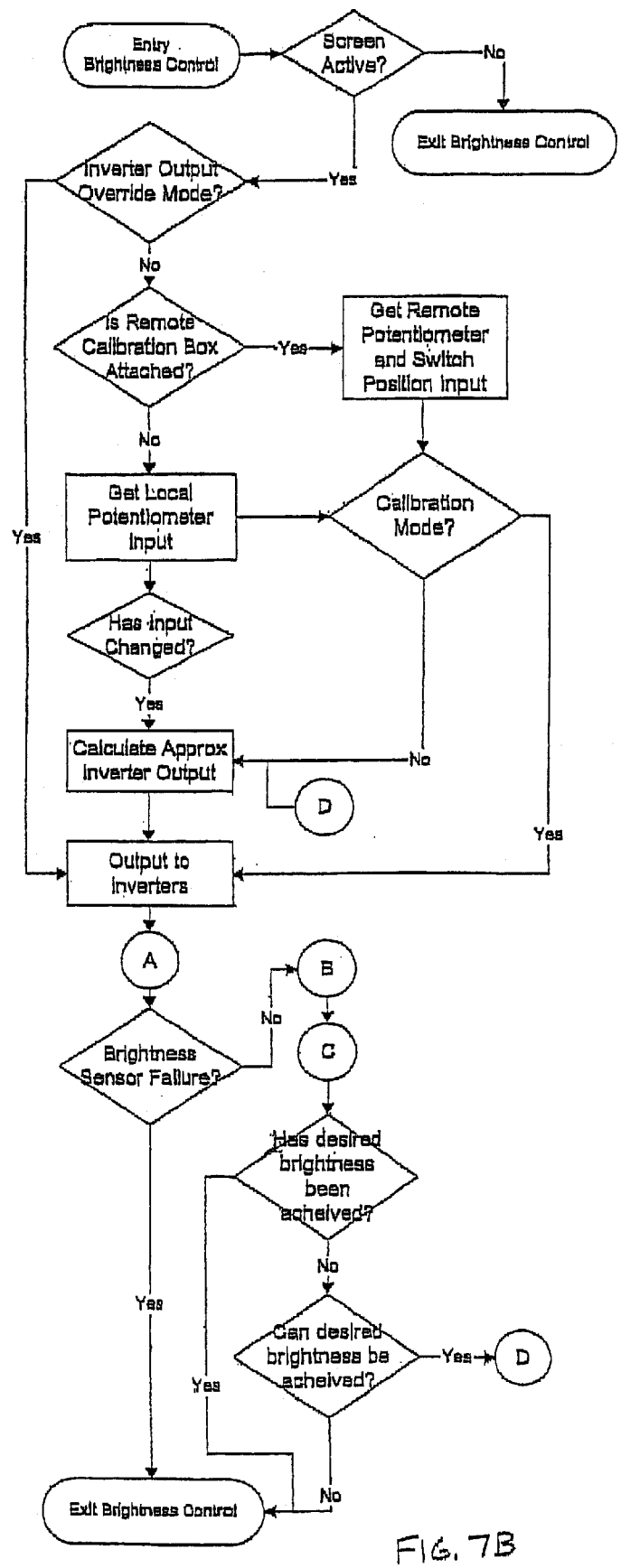
FIG. 7B is a flowchart of an exemplary brightness control process.
Figure 7C:
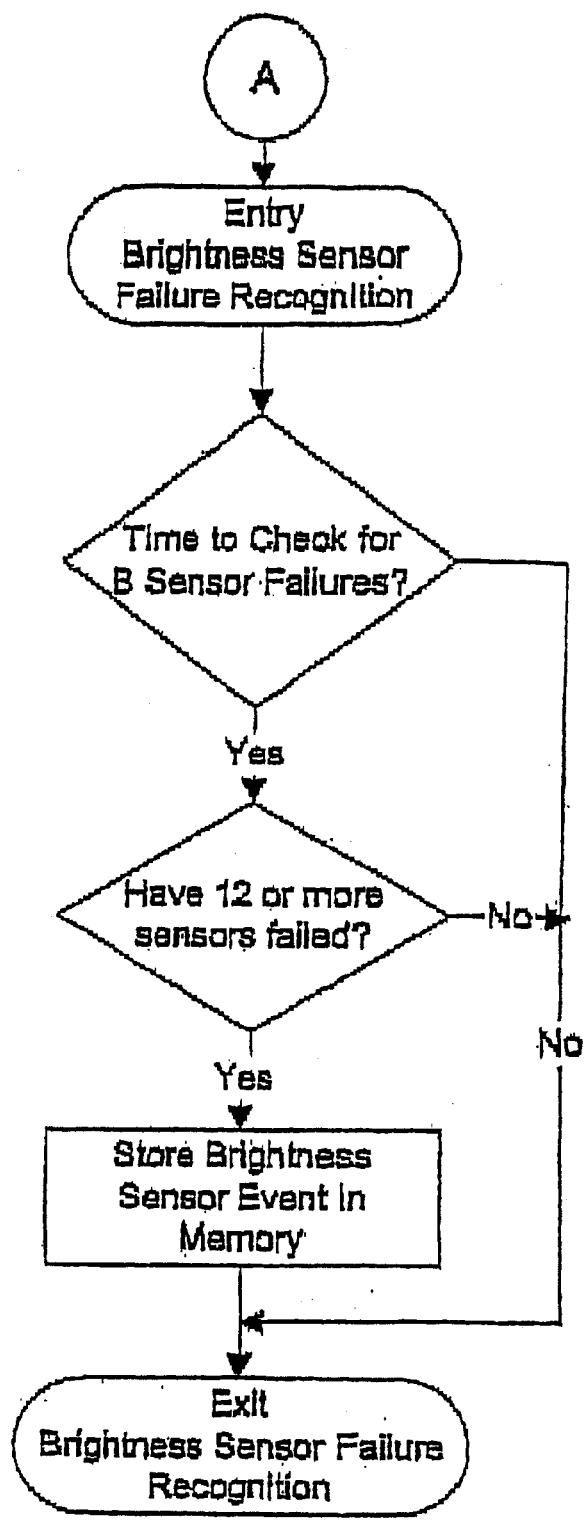
FIG. 7C is a flowchart of an exemplary brightness sensor failure recognition process.
Figure 7D:
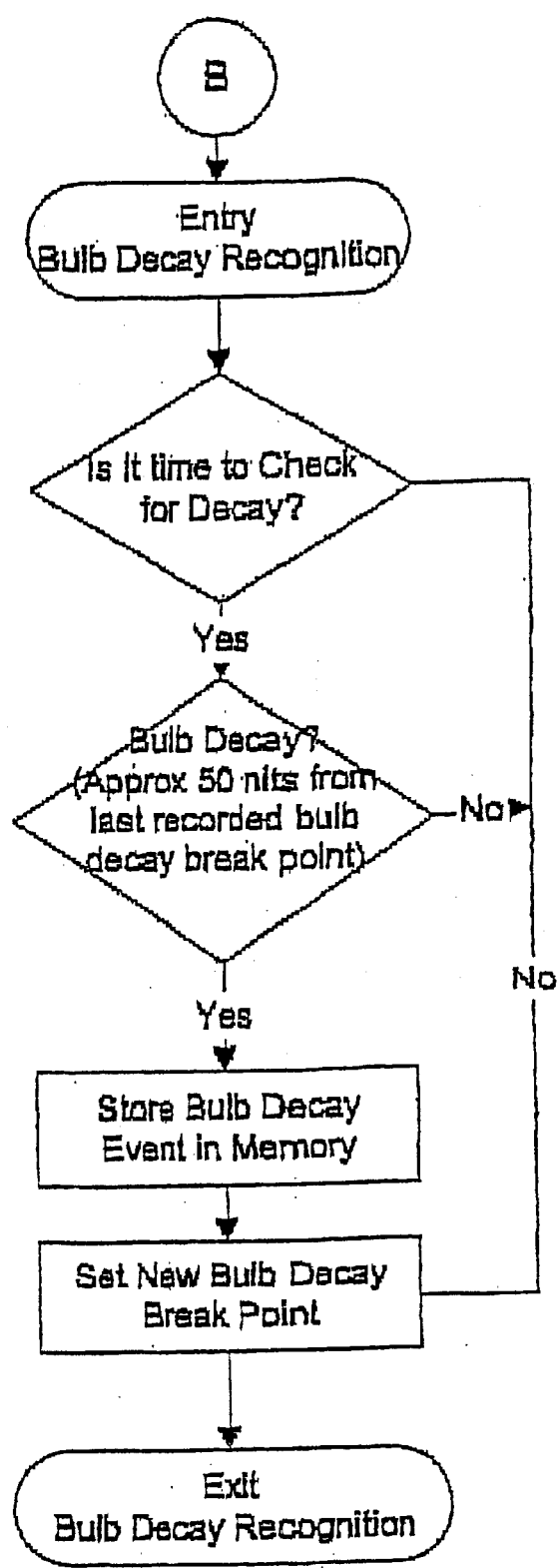
FIG. 7D is a flowchart of an exemplary bulb decay recognition process.
Figure 7E:
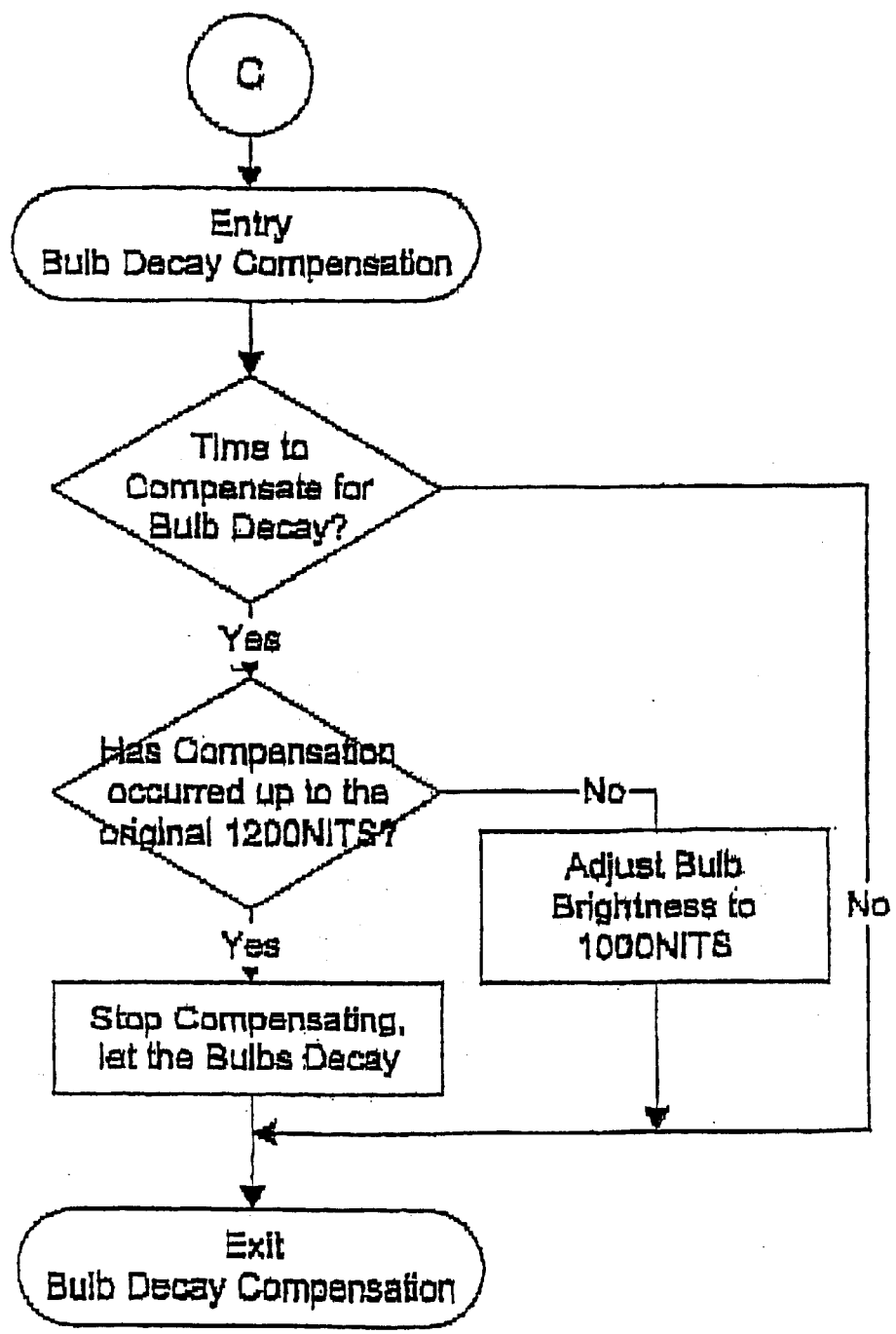
FIG. 7E is a flowchart of an exemplary bulb decay compensation process.

At step 708 brightness control is performed. Step 708 can be performed using a process such as that shown in FIG. 7B. The process depicted in FIG. 7B begins by determining whether a remote calibration box, a local potentiometer, or an override should be used to calculate inverter output. Once this output has been sent to the inverters, a brightness sensor failure recognition process, such as the one depicted in FIG. 7C is performed. As shown in FIG. 7C a brightness sensor event is stored in memory if it is time to check for brightness sensor failures and twelve or more sensors have failed. Processing continues back on FIG. 7B by performing a bulb decay process, such as the one shown in FIG. 7D, and a bulb decay compensation process, such as the one shown in FIG. 7E, if no brightness sensor failures have occurred. The bulb decay process shown in FIG. 7D includes storing a bulb decay event in memory and setting a new bulb decay break point in the event that bulb decay if has occurred. The bulb decay compensation process shown in FIG. 7E includes adjusting the bulb brightness control up to an original limit (here 1200 nits) and then letting the bulbs decay once the original limit has been reached.

Figure 7F:
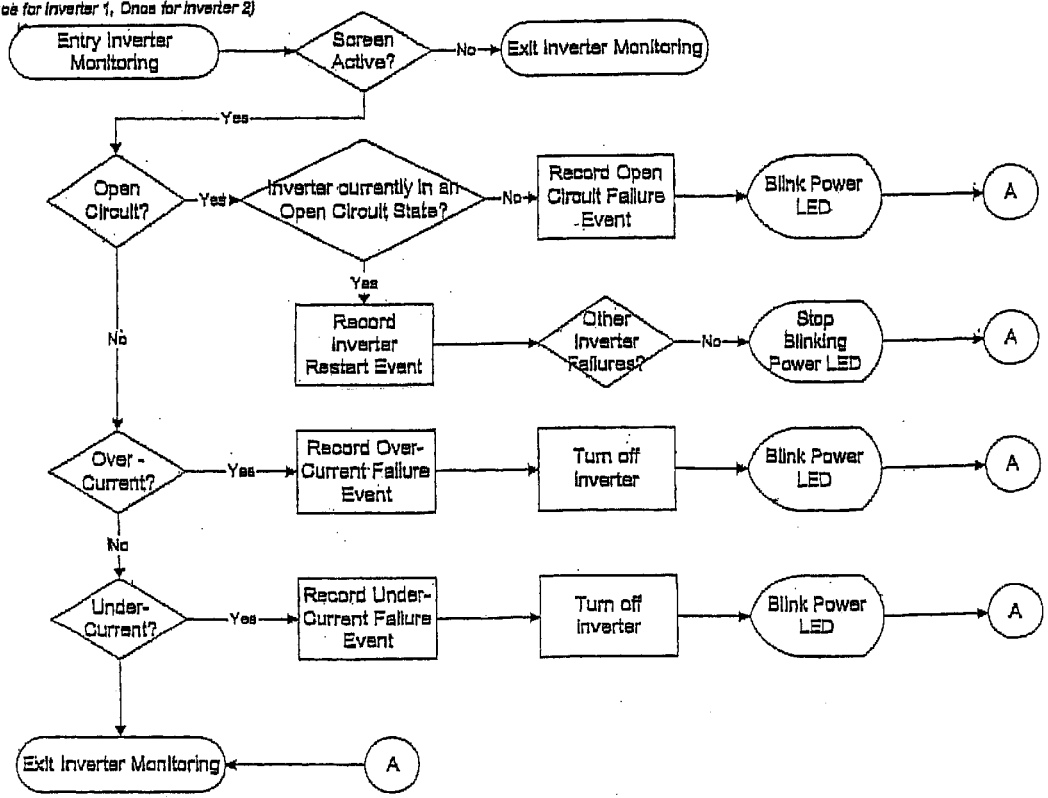
FIG. 7F is a flowchart of an exemplary inverter monitoring process.

Next, step 710 is executed to perform inverter monitoring for the first inverter. Step 710 can be performed using a process such as that shown in FIG. 7F. The inverter monitoring process checks for an open circuit, for over-current and for under-current conditions. If an open circuit condition exists and the inverter is not currently in an open circuit state, the failure event if logged and the power LED is set to blink. If the inverter is in an over-current state then the failure is recorded, the inverter is turned off and the power LED is set to blink. Similarly, when an under-current state exists, the failure is recorded, the inverter is turned off and the power LED is set to blink. Processing then continues with step 712 in FIG. 7A.

Step 712 is executed to perform inverter monitoring for the second inverter. The same process described in reference to step 710 is performed. If there are more than two inverters this inverter monitoring process is performed for each subsequent inverter. Next, at step 714 it is determined whether the PC, or I/O device 510 is requesting a download. If a download is being requested, step 716 is performed and the data from the event log is downloaded to the PC or I/O device 510.

Next, step 718 is performed to monitor the system temperature. Data from the temperature sensors 502 is collected by the controller 500. At step 720 the thermal control process is performed. Step 720 could be performed using a process such as the one depicted in FIG. 7G. As shown in FIG. 7G, the thermal control flow process includes checking for a critical temperature failure and if one exists, recording the critical temperature failure event and setting all three LEDs to blink. The actual temperature is then determined and if it is greater than normal, the fan speed is set. The temperature is then compared to various programmable temperature levels to determine if a caution temperature, over-temperature, phase 1 temperature, phase 2 temperature, or critical temperature failure condition exists. If the temperature is at a caution temperature level, the yellow temperature LED is lit. If the temperature is at an over-temperature, the event is recorded, a counter is started, and the red temperature LED is lit. Phase 1 temperature and phase 2 temperature readings result in recording the event, reducing the bulb brightness level and setting the red temperature LED to blink.

Next, step 722 is performed to monitor and control the fans 402/408. The fan speed can be changed in response to data collected by the temperature sensors 502 or in response to data received by the I/O device 510. A check is made at step 724 to determine if all the fans 402/408 are working properly. If they are not working properly, step 726 is performed to display the failure indicators on the LED and to record the failure in the event log. The backup system data is collected at step 728. The loop begins again at step 706 and continues until the monitor is powered off.

Figure 8:
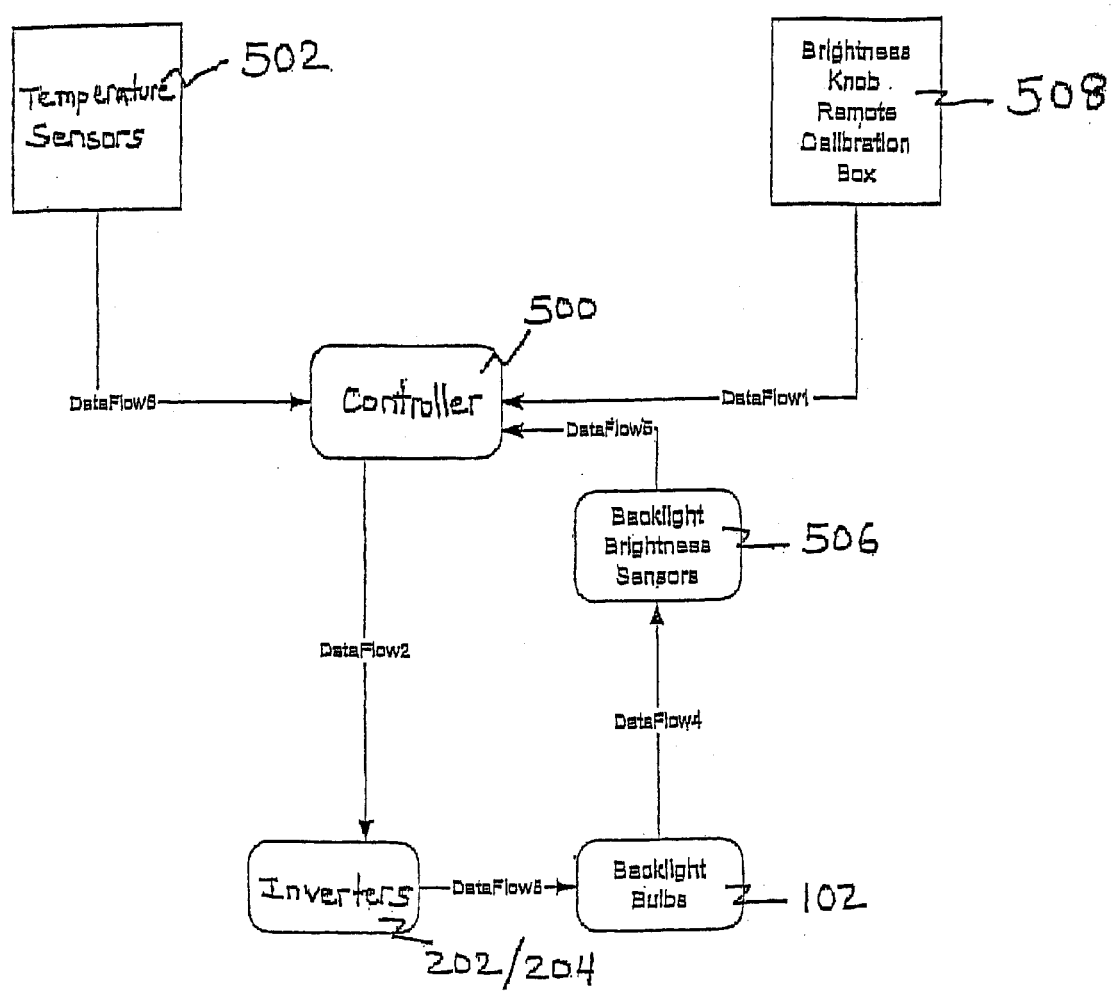
FIG. 8 is a flowchart of a bulb control process performed by a backlit LCD monitor controller.

FIG. 8 is a flowchart of the data flow in an exemplary bulb brightness control module executed by the controller 500. As shown in FIG. 8, the controller 500 executes a program that receives information from temperature sensors 502 and brightness controls 508. The controller 500 provides a command signal to the inverters 202/204 which drive the bulbs 102. Light sensors 506 provide feedback to the controller 500 indicating the amount of generated light. The brightness level changes as the control knobs change. In addition, the brightness level could be controlled through software and this level could be adjusted as a function of time. The bulbs 102 decay and degrade over time, thus consuming more power to produce the same level of luminance from the bulbs. The controller 500 recognizes the decrease in bulb brightness, based on input from the brightness sensors 506, and compensates for it, thus keeping the bulbs 102 brighter longer. This closed loop control can aid in maintaining the bulb output at a requisite level.

Figure 9:
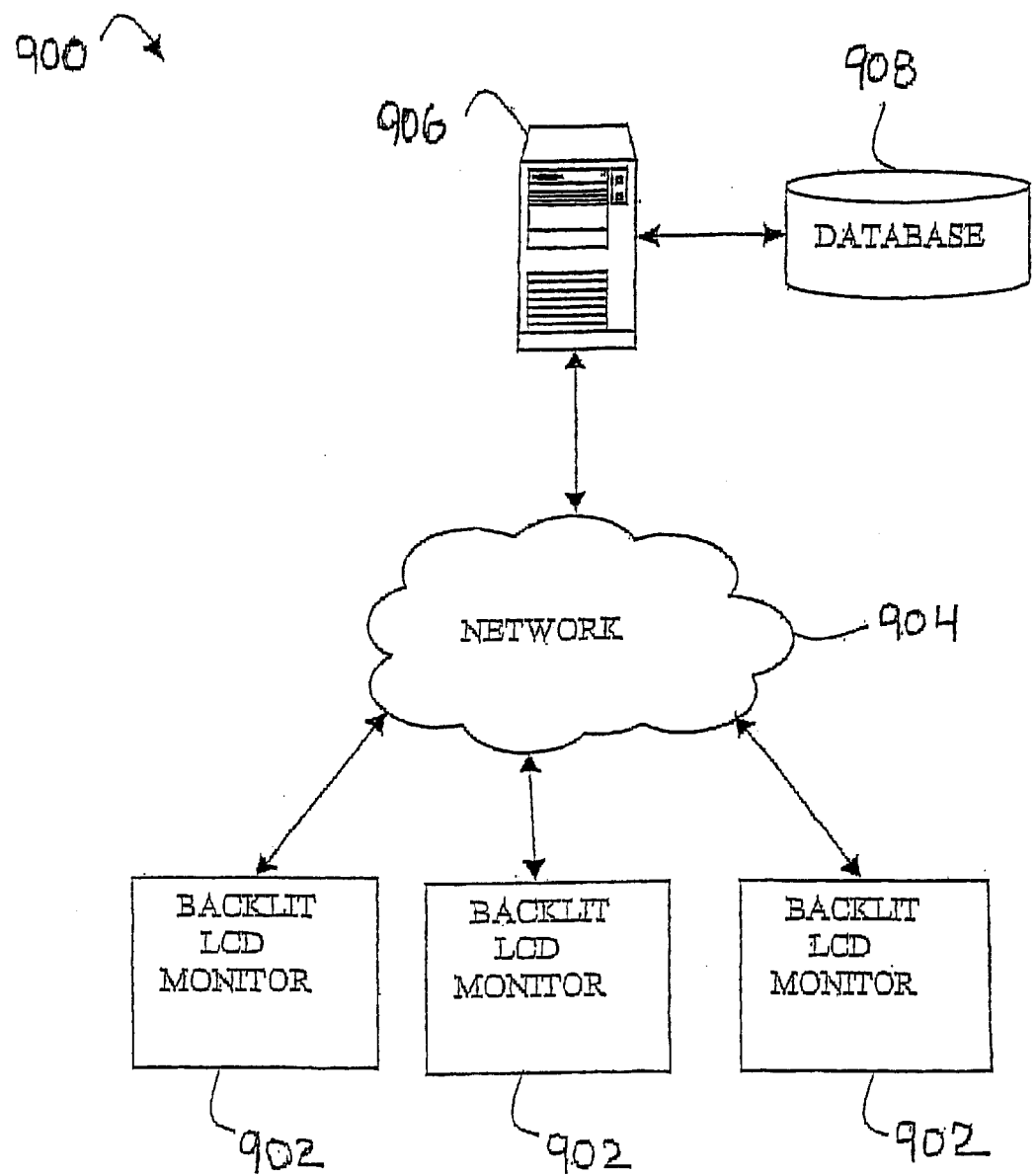
FIG. 9 is a system diagram of an exemplary embodiment of the invention.

The I/O device 510 shown in FIG. 5 can also allow the backlit LCD monitor to provide fault information to a central repository for analysis. FIG. 9 shows an exemplary embodiment of a system 900 in which a number of backlit LCD monitors 902 are coupled to a network 904 through I/O device 510. Such a connection may be made through a network interface such as an Ethernet card. The network may be a propriety network (e.g., extranet, intranet) or a public network (e.g., Internet). Also coupled to the network 904 is a server 906 and database 908. The fault logs of all the backlit LCD monitors 902 can be retrieved periodically (e.g., daily) and stored in a database 908. These logs can then be used to predict faults through fault prediction software and schedule service activities for the backlit LCD monitors. In addition the database 908 could include the serial number of the major components and the software version level being executed by the controller. Such a system is useful in application where the backlit LCD monitors 902 are located in disparate locations such as airport control towers.

Central storage of fault data in database 908 can also be used to detect manufacturing trends. For example, it may be determined that inverters on certain backlit LCD monitors fail more frequently. This information can be indexed to manufacturing date to detect if a manufacturing process is responsible for failures.

In addition, an individual backlit LCD monitor 902 can request service if a particular fault or series of faults are logged. Instead of waiting for the fault log to be retrieved by server 906, the backlit LCD monitor 902 may initiate a service request over network 904 if certain conditions occur. For example, if five sequential fan failures are logged, the controller 500 may be programmed to request fan service by sending a service request through I/O device 510 to server 906.

The invention is not limited to backlit LCD monitors but may be applied to a variety of devices in which performance parameters (such as heat, current, voltage) are monitored, faults logged, and predictive analysis used to schedule maintenance. The networked system of FIG. 9 may be used for devices other than backlit LCD monitors.

The present invention includes both passive and active cooling techniques which can result in a more efficient backlit LCD monitor. The cooling technique of drawing filtered air across the bulbs reduces the interior temperature of the backlit LCD monitor and it allows the bulbs to operate at a higher current and/or in higher ambient conditions. Using the fans only when the temperature of the backlit LCD monitor reaches a pre-selected threshold extends the life of the fans and allows the backlit LCD monitor warm-up process to be more efficient. Bulb life can be extended by providing enough power to provide the selected brightness level and by increasing the current as the bulbs decay. Fewer outages can result from warning operators when temperature levels increase or bulb brightness decreases and by using predictive software and replacing components before the fail and render the monitor inoperable.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention.

What is claimed is:

1. A backlit liquid crystal display monitor comprising:
   a backlight assembly having opposing top and bottom surfaces, said bottom surface including a plurality of fluorescent bulbs having parallel bulb axes, and two or more inverters to drive said bulbs;
   a cooling assembly having opposing top and bottom surfaces, the top surface of said cooling assembly mounted on the bottom surface of said backlight assembly to form a backlight chamber defining air space around said bulbs, said cooling assembly including:
      a light sensor on the top surface of said cooling assembly, said light sensor having a sensor axis that is perpendicular to the bulb axes of said fluorescent bulbs;
      a temperature sensor;
      a heat sink on the bottom surface of said cooling assembly; and
      an air inlet and an air outlet in fluid communication with said closed air space and positioned for causing air to flow across said bulbs;
   a rear cover assembly placed over the bottom surface of said cooling assembly to define an electronics chamber between said rear cover assembly and the bottom surface of said cooling assembly, the electronics chamber being separate from said backlight chamber, said rear cover assembly including:
      an exhaust fan in fluid communication with said air outlet generating a first airflow through said backlight chamber;
      a cover inlet in fluid communication with said air inlet;
      a filter placed over said cover inlet; and
      a fan positioned to draw air towards said heat sink in said electronics chamber generating a second airflow separate from said first airflow; and a controller in communication with said sensors, said inverters, and said fans.

2. The monitor of claim 1 wherein said filter is a HEPA filter.

3. A backlit liquid crystal display monitor comprising:
   a backlight assembly having opposing top and bottom surfaces, said bottom surface including a plurality of fluorescent bulbs having parallel bulb axes, and two or more inverters to drive said bulbs;
   a cooling assembly having opposing top and bottom surfaces, the top surface of said cooling assembly mounted on the bottom surface of said backlight assembly to form a closed air space around said bulbs, said cooling assembly including:
      a light sensor on the top surface of said cooling assembly, said light sensor having a sensor axis that is perpendicular to the bulb axes of said fluorescent bulbs;
      a temperature sensor;
      a heat sink on the bottom surface of said cooling assembly; and
      an air inlet and an air outlet in fluid communication with said closed air space and positioned for causing air to flow across said bulbs;
   a rear cover assembly placed over the bottom surface of said cooling assembly, said rear cover assembly including:
      an exhaust fan in fluid communication with said air outlet;
      a cover inlet in fluid communication with said air inlet;
      a filter placed over said cover inlet; and
      a fan positioned to draw air towards said heat sink; and
   a controller in communication with said sensors, said inverters, and said fans;
   a brightness control device in communication with said controller; and
   a remote brightness control device in communication with said controller, said remote brightness control device overriding said brightness control device.

4. The monitor of claim 3 wherein:
   said remote brightness control device includes a switch for designating a brightness range and a potentiometer for specifying a brightness within a designated range.

5. The monitor of claim 1 further comprising:
   a fan status indicator light in communication with said controller;

a temperature status indicator light in communication with said controller; and a power status indicator light in communication with said controller.

6. The monitor of claim 1 further comprising an I/O device that is in communication with said controller.

7. The monitor of claim 6 wherein said I/O device is a serial port.

8. The monitor of claim 6 wherein said I/O device is an infrared data association port.

9. The monitor of claim 6 wherein said I/O device is connected to a network.

10. The monitor of claim 9 wherein said network is the Internet.

11. The monitor of claim 9 wherein said network is an intranet.

12. The monitor of claim 1 wherein each said inverter drives a different portion of said bulbs.

13. The monitor of claim 1 wherein said light sensor generates real-time diagnostic data and wherein said light sensor is dynamically reconfigured in response to said diagnostic data.

* * * * *